Oct. 29, 1929.　　　C. ENGESSER　　　1,733,952

HAND PROPELLED VEHICLE

Filed April 4, 1928

INVENTOR
CHARLES ENGESSER
BY
ATTORNEY

Patented Oct. 29, 1929

1,733,952

UNITED STATES PATENT OFFICE

CHARLES ENGESSER, OF NEW YORK, N. Y.

HAND-PROPELLED VEHICLE

Application filed April 4, 1928. Serial No. 267,272.

The object of my invention is to provide a hand propelled vehicle readily adapted for use by children as a toy in which a minimum force is required to propel the vehicle.

Another object is the provision of a toy simulating the effect produced in horse back riding and causing the user to be raised and lowered with the seat of the vehicle.

Another object is the furnishing of means whereby the vehicle may coast without the rider exerting any propelling force.

Still other objects will be apparent from the detailed description hereinafter of a preferred form of my invention. It is to be understood, however, that I do not limit myself to the specific embodiment illustrated, but that the scope of my invention is limited only by the scope of the appended claims and the prior art. The mode of operation and the organization of my invention may better be understood by referring to the following description taken in connection with the accompanying drawing forming a part thereof, in which, Figure 1 is a plan view of my hand propelled vehicle.

Like characters of reference in the various views indicate like parts of the vehicle.

Figure 1:
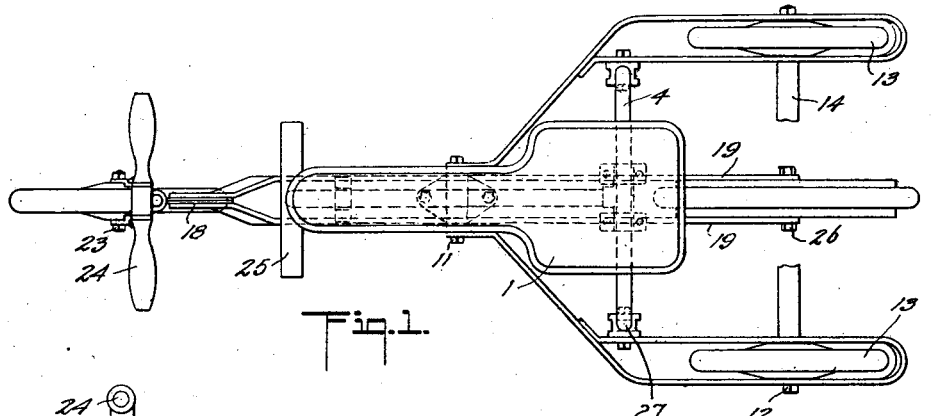

The formed seat 1 is rigidly affixed to support 2 having an integral downwardly projecting portion 7 pivoted to the chassis member 3 at the point 5 near the bottom of the front incline 18. The rear portion of the seat is rigidly mounted at 6 upon the U-shaped upright member 4 bearing upon and pivotally supported on the frame member 8. The bracket 10 is affixed to the chassis member 3 and the frame member 8 is pivoted thereto at its upper end 11. The frame member 8 on either side of the vehicle carries an individual axle 12 for each of the rear wheels 13. A guard 14 in the form of an inverted U is rigidly connected to and between the axles 12 and is of sufficient height to clear the eccentric driving wheel 15. Together with the U-shaped upright member 4 the guard gives the construction additional rigidity and strength. The upright 4 is pivoted to the frame member 8 at a convenient pivot 27 at some distance from the pivot 11, say at one half the distance from pivot 11 to axle 12. In order to allow for a certain amount of longitudinal reciprocation while the upright 4 is being raised and lowered, the pivot pin 27 rides in an elongated slot 28, thus preventing any binding of the parts.

Figure 2:
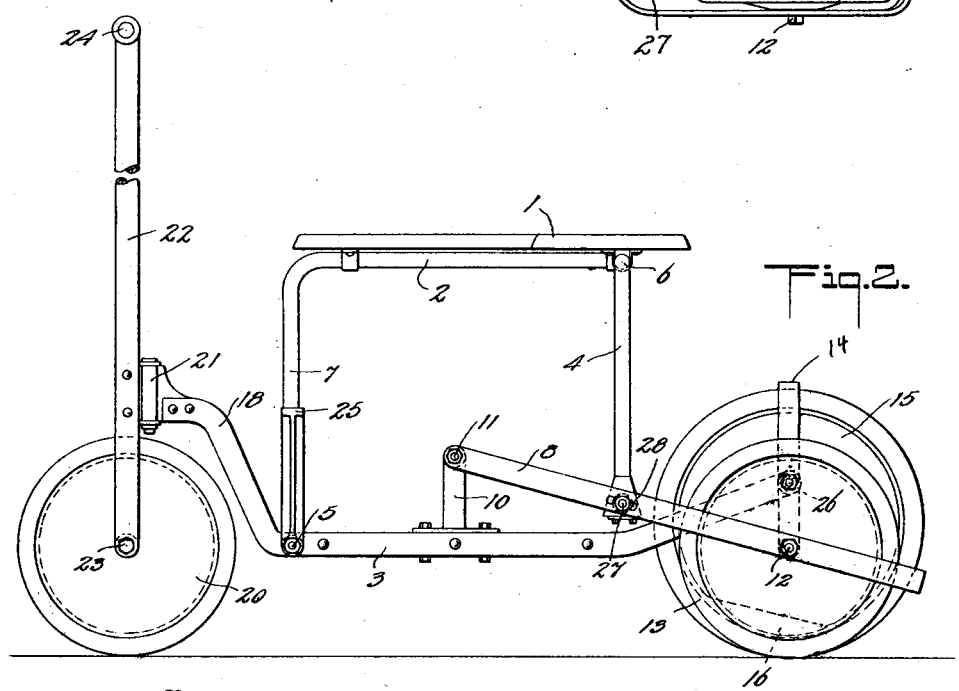
Figure 2 is a side view thereof when the eccentric driving wheel axis is in its uppermost position.

The chassis member 3 has an upwardly inclined portion both at its front end 18 and at the rear end 19, the front incline 18 being of such a slope and length that it will never bear on the periphery of wheel 20 no matter what position the vehicle may be in. The rear incline 19 is of such a slope that when the eccentric driven wheel 15 rotates about its uppermost axis, as shown in Figure 2, the chassis member will be horizontal.

The driving and steering lever 22 is provided with a handle 24 at a convenient height and the axle 23 at its lower end for the front wheel 23. The lever is pivoted to the incline 18 by means of the vertical pivot 21 to enable the turning of the vehicle to the right or left.

The eccentric driving wheel 15 is of a larger diameter than the rear wheels 13; by way of example it may be 10 inches or more when the wheels 13 are eight inches in diameter or less. The end of the incline 19 is pivotally affixed to the eccentric pin 26 and this forms the only connection that the driving wheel 15 has with the vehicle. A counterweight 16 is cast integral, or affixed to, the driving wheel 15 at such a position that it is about 120 to 150 degrees in advance of the axial pin 26. The purpose hereof is to avoid dead centers in the operation of the vehicle and to tend throw pin 26 therebeyond.

Figure 3:
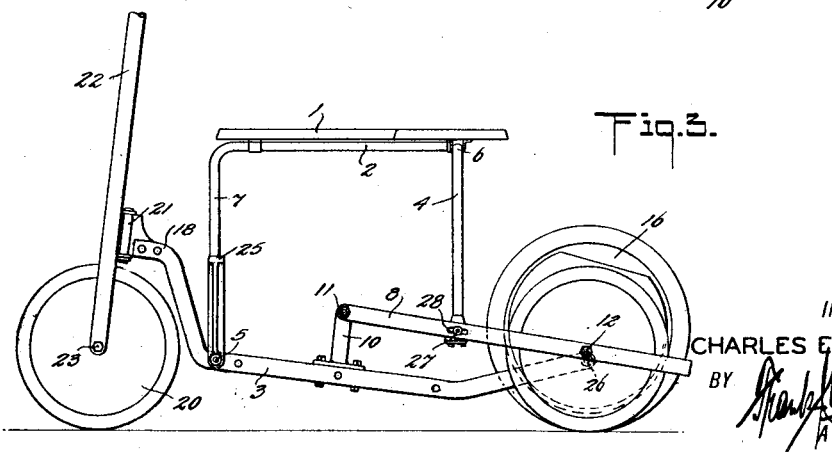
Figure 3 is likewise a side view, however, when said axis is in its lowermost position.

In operation, the user seats himself upon the vehicle and his weight will cause the vehicle parts to assume the position illustrated in Figure 3, in which the eccentric axis 26 is in its lowermost position. The lever 22 will thus be nearest the rider, who, grasping the handles 24 and steadying himself somewhat against the foot rests 25, pushes the lever forwardly. This tends to pivot the chassis member 3 about the front wheel axle 23 and raise said member, and all the remaining supporting members connected therewith, against the weight of the rider. In raising the incline 19, the eccentric axis 26 is carried therewith and the eccentrically mounted driving wheel 15 is caused to rotate. Once started in rotation, momentum is imparted to the counterweight 16 and the continued forward and rearward actuation of lever 22 will cause the vehicle to move forward at an increasing speed. During such propelling of the vehicle, it is obvious that the seat 1 will be reciprocated vertically in that, while the axes 12 are always at the same distance above the ground, the pivot 11 is raised and lowered. In starting, it is to be noted that the pushing of lever 22 forwardly from rest, tends to carry the eccentric axis 26 clockwise, due to the combined forward and upward force acting when the chassis member 3 is carried upwardly. Thus the eccentric wheel 15 will turn clockwise until the uppermost position of axis 26 is reached, when the rider holds the lever 22 in its forward position momentarily. Referring to Figure 2, it will be seen that in this position the counterweight 16 tends to start the eccentric driving wheel 15 in a counterclockwise rotation, as is required to obtain forward propulsion of the vehicle. When the driver pulls the lever 22 towards himself, this will tend to move the eccentric axis 26 downwardly, and the result will be that the two forces combine to start rotation in the counterclockwise direction, moving the vehicle forward. Once having been started in that direction, the momentum resulting from the presence of counterweight 16 will tend to keep the direction of rotation, so that the further alternate pushes and pulls on lever 22 will propel the vehicle forward.

In order to coast, the rider need but to push hard and suddenly on lever 22, thereby lifting the eccentrically mounted driving wheel 15 clear off the ground and holding it there.

In order to stop the vehicle rather quickly, he may pull the lever hard and retain the same in its innermost position in Figure 3, causing the driving wheel 15 to have a braking effect.

What I claim is:

1. In a vehicle, a frame, front and rear wheels on said frame, an auxiliary wheel between said rear wheels and driving means to which said auxiliary wheel is eccentrically and rotatably affixed, said means being pivotable about said front wheel and hand actuated for displacing said auxiliary wheel and imparting forward motion to said wheels as well as a limited vertical reciprocating motion to said frame.

2. In a vehicle, a front wheel, a frame, rear wheels thereon, means for pivoting a portion of said frame through a limited arc about the center of said front wheel, one of said wheels being an eccentric wheel, connections between said frame and said eccentric wheel of such a nature that when a portion of said frame is pivoted said eccentric wheel will be rotated imparting motion to the vehicle and raising and lowering the remaining portions of said frame.

3. In a vehicle, a frame including front and rear wheels of the same diameter, an auxiliary wheel of larger diameter than said front and rear wheels, said auxiliary wheel being eccentrically connected to the frame, a lever pivotable about said front wheel and rigidly connected to said frame and adapted to vertically reciprocate said frame simultaneously imparting rotary motion to said auxiliary wheel, and a seat on said frame.

4. In a vehicle, a frame member, a front wheel, a hand lever on said member pivoted about said front wheel, means raising and lowering the rear of said frame member, connecting means pivoted to said frame member about midway thereof, rear wheels on said connecting means, an upright member pivotally supported on said frame, a second upright member pivotally supported on said connecting means, and a seat carried by said uprights and adapted to be raised and lowered with said frame member when the vehicle is in motion.

5. In a vehicle including front and rear wheels, a frame, and an operating mechanism for said vehicle comprising a wheel whose periphery is in continuous contact with the roadway, an orbitally moving eccentric axis of rotation for said wheel, pivotal connections from said eccentric axis to said frame, and a hand actuated lever for imparting rotation to said wheel thereby propelling the vehicle and alternately raising and lowering said frame.

6. In a vehicle, a front wheel, a hand actuable lever pivotable about said front wheel, a horizontal member rigidly connected to said lever just above said wheel, a vertical structure pivotally supported on said member, an auxiliary wheel eccentrically and rotatably affixed to said horizontal member, a second member pivoted to the center of said horizontal member, rear wheels on said second member, and a strut supported on said second member with its upper end connected to the rear of said vertical structure and its lower end capable of a limited longitudinal movement in said second member, whereby the longitudinal reciprocation of said hand actuable lever propels said vehicle forwardly at the same time vertically reciprocating said vertical structure.

7. In a vehicle, a front wheel, a rear wheel of larger diameter, a substantially horizontal member supported on the axis of said front wheel and eccentrically of the axis of said rear wheel, means for manually applying a reciprocating longitudinal force to said member for propelling said vehicle horizontally and imparting to said member a vertical reciprocatory motion.

8. In a vehicle, a front wheel, a main frame pivotally supported thereon, a rear wheel of larger diameter than said front wheel, said frame being eccentrically connected thereto, an auxiliary frame pivoted to the center of said main frame, rear wheels of the same diameter as said front wheel on said auxiliary frame, a lever pivoted about said front wheel and connected to said main frame for imparting forward motion to said vehicle and for lifting said rear wheel of larger diameter off the roadway during operation at the will of the operator without stopping the forward motion of the vehicle.

9. In a vehicle, a front wheel, a main frame pivotally supported thereon, a rear wheel of larger diameter than said front wheel eccentrically connected to the main frame, an auxiliary frame pivoted to said main frame, rear wheels of the same diameter as said front wheel on said auxiliary frame, a lever pivoted about said front wheel for imparting forward motion to the vehicle and for exerting a braking action on said vehicle at the will of the operator for stopping said forward motion.

10. In a vehicle a front wheel, a main frame pivotally supported thereon, a rear wheel of larger diameter than said front wheel eccentrically connected to the main frame, an auxiliary frame pivoted to said main frame, rear wheels of the same diameter as said front wheel on said auxiliary frame, a lever pivoted about said front wheel and rigidly connected to said frame which on reciprocation imparts forward motion to the vehicle and when retained in one extreme position lifts said rear wheel of larger diameter from the roadway without stopping the forward motion and when retained in the other extreme position exerts a braking action to stop said vehicle.

11. In a vehicle, a main frame including a front wheel and a rear wheel of larger diameter eccentrically connected thereto, a hand lever pivotable about said front wheel and rigidly connected to said main frame, an auxiliary frame pivotally connected to said main frame, a seat support on said frames for unequally transmitting the weight of the rider thereto, a counterweight on said rear wheel of larger diameter at an angular displacement from the eccentric connection of said wheel to said main frame, whereby the force propelling the vehicle has components due to the force exerted by the rider on said hand lever, the weight of the rider, and the momentum of said counterweight.

In witness whereof, I hereunto subscribe my name this 30th day of March, 1928.

CHARLES ENGESSER.